United States Patent [19]
Nishinomiya et al.

[11] Patent Number: 5,980,957
[45] Date of Patent: *Nov. 9, 1999

[54] METHOD FOR PRODUCING POWDERY SEASONING

[75] Inventors: Takeshi Nishinomiya; Hiroshi Yamamoto; Tsutomu Yamaura; Jiro Kataoka; Tadaaki Saegusa, all of Kawasaki, Japan

[73] Assignee: Ajinomoto Co., Inc., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/605,551

[22] Filed: Feb. 20, 1996

[30] Foreign Application Priority Data

Feb. 17, 1995  [JP]  Japan .................................... 7-052024

[51] Int. Cl.⁶ ................................ A23J 1/14; A23J 3/16; A23L 1/20
[52] U.S. Cl. .................................. 426/46; 426/60; 426/52
[58] Field of Search .................................. 426/44, 46, 52, 426/60, 650, 18; 530/378

[56] References Cited

U.S. PATENT DOCUMENTS

| | | |
|---|---|---|
| 3,914,436 | 10/1975 | Nakadai et al. .......................... 426/46 |
| 4,115,591 | 9/1978 | Noda et al. . |
| 4,892,746 | 1/1990 | Donida et al. .......................... 429/598 |

FOREIGN PATENT DOCUMENTS

| | | |
|---|---|---|
| 57-33570 | 2/1980 | Japan . |
| 57-105158 | 6/1982 | Japan . |
| 57-177669 | 11/1982 | Japan . |
| 58-212762 | 12/1983 | Japan . |
| 61-247353 | 11/1986 | Japan . |
| 64-39977 | 2/1989 | Japan . |
| 4-197153 | 7/1992 | Japan . |
| 7-327631 | 12/1995 | Japan . |

OTHER PUBLICATIONS

Kataka et al JP38–8043758, Abstract From JPO.

*Primary Examiner*—Arhtur L. Corbin
*Attorney, Agent, or Firm*—Oblon, Spivak, McClelland, Maier & Neustadt, P.C.

[57] ABSTRACT

A method for producing powdery seasoning with constant quality, with no occurrence of coagulation under storage. The method comprises culturing koji mold in heated and expanded defatted soybean, maintaining a dispersion of the resulting culture in a sodium chloride solution under enzymatically active conditions, separately collecting a liquid dispersion medium from the enzymatic reaction product, adding a liquid seasoning to the liquid dispersion medium, and spray drying the resulting mixture.

5 Claims, No Drawings

METHOD FOR PRODUCING POWDERY SEASONING

BACKGROUND OF THE INVENTION

1. Field of the Invention

The present invention relates to a method for producing powdery seasoning. More specifically, the present invention relates to a method for producing powdery seasoning, for example, powdery soy sauce.

2. Related Background Art

From the demand of diversified dietary life, a wide variety of instant foods have been developed in combination with seasonings for use in the foods. Seasonings for use in instant foods are mostly produced and processed in powdery forms. Furthermore, powdery seasonings may be stored under inappropriate conditions such as high temperature, high humidity and excess exposure for a considerably long period from the production into the hands of consumers.

Powdery seasoning is currently on production and supply, taking account of these potentially adverse conditions. However, it is impossible to anticipate all of the conditions to which such seasonings may possibly be exposed. Furthermore, the preventive measure against any adverse condition with an extremely low probability of occurrence will eventually cause prominent escalation of the production cost, which is not practical.

Powdery seasoning is entirely or partially in powder or granule form. A substance in powder or in granule form has a larger surface area per unit weight. Because powdery seasoning also contains a hygroscopic component such as sodium chloride, individual powdery particles or granules are bound together to form a mass, which readily coagulates, disadvantageously.

The coagulation of powdery seasoning gives the impression of deteriorated quality, which seriously damages the merchandise value. Prior to or after the occurrence of coagulation, the taste or flavor of powdery seasoning may eventually be deteriorated.

As conventional methods for preventing coagulation of powdery seasoning, it is known a method comprising adding and mixing an edible substance which turns to hydrophobic in a dry state, namely oxidized starch, processed starch such as phosphorylated starch, dextrin, naturally occurring gum such as gum arabic, or protein such as gelatin. Some of such methods have been used in a practical sense, for example, a method comprising adding dextrin so as to prevent coagulation of "powdery soy sauce", as disclosed in Japanese Patent unexamined Publication No. JP-A-64-039977.

However, the following problems are noted, concerning the preventive measures against coagulation of powdery seasoning according to these known methods.

That is, in case an edible substance which turns to hydrophobic in a dry state is mixed with the powdery seasoning and the like, it is necessary for the substance to add at a relatively high concentration, for example, about 10 to 30% by the weight ratio as the anhydride thereof.

These substances should never deteriorate the essential taste and flavor of the seasoning. Therefore, these substances should be selected from those substances with no taste or with taste as dry as possible.

When a substance with no taste or with taste as dry as possible is added to powdery seasoning to a final concentration at which the substance can exert an effect of preventing coagulation, powdery seasoning is consequently diluted, and thus the taste and flavor of the powdery seasoning is decreased per unit dose. In other words, potentially, the effect of powdery seasoning may be lowered apparently.

Furthermore, apparent change of powdery seasoning may be observed with addition of these substances, giving unnatural impression.

When a substance with an effect of preventing coagulation is added, an additional treatment such as further addition of sodium chloride or salt may be needed so as to recover and correct the deterioration of the taste and flavor per unit dose.

Compared with powdery seasoning of itself, most of edible substances turning hydrophobic in a dry state are substantially costly. Therefore, producing powdery seasoning having an effect of preventing coagulation with the addition of these substances may inevitably involve the increase of the production cost. Also, the increase of the production cost limits the range of selectable substances to be added.

During the production process of powdery seasoning, during the drying process in particular, spray drying is carried out in most cases. However, even a hydrophobic substance in a dry state forms a viscous solution when mixed with a raw material liquid seasoning, which is disadvantageous for handling. Still further, characteristically, a hydrophobic substance in a dry state is so hardly miscible with a raw material liquid seasoning at an initial stage that laborious extra works such as specific agitation procedure or heating may be required for homogeneous mixing of the substance with the liquid seasoning so as to prevent any development of coagulation or mass. Hence, the entire process will be complex. Further, adhesion onto the inner wall of a spray dryer may occur, resulting in a lower yield of products, or smooth operation of the dryer will be blocked. Otherwise, because the raw materials may be partially overheated during drying, various disadvantages such as the decomposition or denaturation of tasty components or flavor components may develop.

It is also noted that some edible substances turning hydrophobic in a dry state may generate by-products having "browning" actions of the resulting products during the drying process or under storage.

As has been described above, problems not yet overcome have been remarked for the known methods for preventing coagulation of powdery seasoning comprising adding an edible substance turning hydrophobic in a dry state. Conventionally, vast amounts of energetic technical efforts have been devoted toward the problems to be overcome. However, no essential counter-measure has been found yet.

SUMMARY OF THE INVENTION

It is an object of the present invention to provide a method for producing high-quality powdery seasoning at a large scale and less cost in a stable fashion, so as to overcome the above-mentioned problems and to absolutely prevent the occurrence of coagulation in powdery seasoning.

As an alternate method replacing for the conventional method comprising adding such edible substance, the present invention proveides a practical and effective method for producing a powdery seasoning which turns hydrophobic in a dry state as such. The powdery seasoning obtained by the present invention is also aplicable as an additive for preventing occurrence of coagulation or denaturation of conventional powdery seasonings.

According to the present invention, such powdery seasoning which turns hydrophobic in a dry state is composed of a hydrolysate generated by reacting koji mold with vegetable protein.

Particularly, most preferred embodiment of the present invention provides a method for producing a powdery seasoning which contains a hydrolysate generated by reacting defatted soybean itself with a soy sauce brewing koji mold in a solid culture medium principally composed of the defatted soybean.

The method according to the present invention comprises in practical an applicable step of spray drying and powdering a mixture composed of the hydrolysate of the defatted soybean and a liquid seasoning to be powdered.

The present invention relates to a method for producing powdery seasoning which contains higher levels of tasty amino acids and low-molecular peptides and is capable of retaining preferable taste and flavor immediately after the production with no occurrence of coagulation or denaturation even under severe storage conditions for a long term. Thus, the present powdery seasoning is applicable to a wide variety of fields, for example as a seasoning for instant foods which should keep long-term shelf life.

According to one aspect of the present invention, a method for producing powdery seasoning comprises the steps of heating and expanding defatted soybean with a rapid decompression to form an expanded spybean, culturing koji mold in the expanded soybean obtained by said expanding step, maintaining a dispersion of the culture from said culturing step in the form of an aqueous dispersion within a sodium chloride solution under enzymatically active conditions, separately collecting a liquid dispersion medium from the reaction product generated in said maintaining step, adding a liquid seasoning to the liquid dispersion medium obtained from said collecting step to provide a mixture, and spray drying the mixture.

In the present invention, the product powdery seasoning includes substances generally grouped as seasonings, for example dried and pulverized soy sauce, dried and pulverized "Miso" or brewed soybean paste, dried and pulverized Worcestershire sauce-type sauce, "palatable seasoning" in crystal or granule, table salt in crystal or granule, various raw material seasonings, for example, powdery yeast extract, powdery fish-brewing sauce, various micro-ground spices for example "pepper mixed powder" and "red pepper mixed powder", and the like.

Additionally, various instant soups to which is added hot water when served may be grouped as the product powdery seasoning by the present invention, for example, "instant soybean paste soup", "instant clear soup", various types of soup to which is added hot water when served, for example "instant consommé soup", "instant potage soup", various "sprinkling foods" for example "katsuo-flake sprinkling powder", "seaweed-tea sprinkling powder", powdery seasoning attached to various instant foods, for example, "instant soup for bag-packaged Chinese noodle", "soup for instant Chinese noodles packaged in cups".

According to a preferred embodiment of the present invention, the method is carried out in accordance with a process which comprises the steps of culturing koji mold in the expanded soybean, maintaining a dispersion of the koji culture from the culturing step in the form of an aqueous dispersion within a sodium chloride solution under enzymatically active conditions, separately collecting a liquid dispersion medium from the resulting reaction product and spray drying a mixture of the liquid dispersion medium and a liquid seasoning.

As such koji mold to be cultured in the expanded soybean, a soy sauce brewing koji mold is appropriate. The koji mold may be cultured in a solid medium made of the expanded soybean which is produced by heating and expanding defatted soybean of NSI (Nitrogen Solubility Index) of 30 or more by using an extruder to a final antigen titer of 3 or less after the expansion process, followed by addition of water to the resulting soybean to a final moisture content of 30 wt % or more to 40 wt % or less to prepare the solid medium.

As the defatted soybean for the raw material, soybean cake defatted through solvent extraction or the ground product of the cake is appropriate. However, defatted soybean with the protein denatured severely should be avoided. In other words, any defatted soybean or soybean flour of NSI of 30 or more is suitable as the raw material.

The NSI, Nitrogen Solubility Index, is defined as the percentage (%) of the total nitrogen content of a sample solubilized into water extract under stirring at room temperature to the total nitrogen content of the sample measured by the well-known Kjeldahl method. The index is an indicator representing the extent of protein denaturation of a sample.

So as to heat and expand the defatted soybean, a process by means of an extruder may preferably be carried out. Any type of extruders, namely mono-axis type or double axis type, may be used satisfactorily.

Prior to the extruder process, preferably, water should be added at about 10 wt % to 30 wt % of the moisture content of the raw material defatted soybean. After the moisture content is adjusted as such, the defatted soybean is passed through the extruder for heating under pressurized condition, and thus, the soybean is expanded by a rapid decompression upon exit with steam explosion from the soybeam.

During the extruder process, the operation conditions of the apparatus therefor should be controlled and adjusted so that the antigen titer of the defatted soybean after the heating and expansion process might be 3 or less.

The antigen titer of the expanded soybean is assayed by using passive erythrocyte coagulation reaction with diluted calf anti-serum. The minimum dilution rate at which erythrocyte coagulation occurs should be represented as a logarithmic figure with 2 as the base, which is called "Titer".

Water should be added to expanded soybean to a final moisture content of 30 wt % to 40 wt %.

The range of the amount of water to be added is determined so that the growth of the inoculated koji seed might be optimum. Below the range, koji growth is slow; above the range, koji growth is inhibited because excess water is above the water retention level of the expanded soybean. Water overflow eventually facilitates bacterial contamination.

As the soy sauce brewing koji mold, soy sauce brewing koji principally composed of Aspergillus sojae may preferably be selected.

As the seed mold of the soy sauce brewing koji, use may be made of a commercially available seed culture for soy sauce brewing koji mold. For example, use may be made of "Usumurasaki" as the product name (commercially available from KABUSHIKI KAISHA HIGUCHI MATSUNO-SUKE SHOTEN, Japan).

If needed, a novel koji mold for soy sauce brewing may be isolated and adjusted of their activity, which may be used then as a seed culture.

Conventional methods and conditions for soy sauce brewing may be applicable to the method and conditions for culturing the soy sauce brewing koji mold.

The koji culture should be maintained in the form of an aqueous dispersion within a sodium chloride solution of 15 wt % or less under enzymatically active conditions within 300 hours until the formol type nitrogen reaches 50% or more of the total nitrogen, to obtain the reaction product or hydrolysate described above.

The koji culture should be maintained within a sodium chloride solution of 15 wt % or less. In a sodium chloride solution of a higher concentration above 15 wt %, the following problems may occur; the levels of the amino acids and low-molecular peptides being responsible for attractive taste and being contained in the reaction product may be lowered due to the decrease of the enzyme activity; the high concentration of sodium chloride may contaminate the product powdery seasoning; or strong fermentation odor may develop.

Preferably, the concentration of the sodium chloride solution should be within a lower concentration range in the range described above, for example a range of 3 wt % to 5 wt %, in particular. Within such lower concentration range, bacterial contamination may possibly occur, but the presence of a suitable bacteriostatic substance such as ethyl alcohol and ethyl acetate can prevent bacterial contamination.

The reaction in the sodium chloride solution should be continued within 300 hours until the formol-type nitrogen reaches 50% or more of the total nitrogen contained in the reactive substances.

In a reaction for a long term above 300 hours, high-molecular peptides with non-attractive taste giving bitterness and roughness may be generated as by-products. If the formol-type nitrogen to the total nitrogen is below 50%, the amino acids and low-molecular peptides responsible for attractive taste may be generated insufficiently.

The total nitrogen can be measured by the well-known Kjeldahl method. The formol-type nitrogen can be measured by the formol assay comprising reacting the amino groups of the amino acids in a sample with formalin in a neutral pH and titrating the hydrogen ion released from the amino groups with an alkali solution.

The koji culture should be maintained within a sodium chloride solution under enzymatically active conditions. Specifically, the culture should be retained within a range of pH 1.5 to pH 6.5 and a temperature range of 25° C. to 40° C. Within these ranges, the activity of the hydrolase of koji, the activity of protease in particular, reaches the maximum. Within the afore-mentioned ranges, the maximum activity of the koji hydrolase may vary depending on the type of the koji mold or the species of the isolated strain, so that it should be preliminarily determined the specific range where an applicable koji strain can exert its peak activity, preferably.

The reaction product retained under enzymatically active conditions is an aqueous dispersion, containing higher levels of the amino acids and low-molecular peptides with attractive taste derived from the protein in the defatted soybean and dispersing therein non-degraded solid components.

When spray drying the aqueous dispersion dispersing therein solid components as such, it is concerned that a spray nozzle may be occluded accidentally. Prior to the spray drying process, therefore, the solid components should be removed from the aqueous dispersion to separate and collect the liquid dispersion medium free of solids.

Any method or device for removing the solid components to collect the liquid dispersion medium may be used with no limitation. For example, use may be made of continuous sharpless centrifuges, batchwise compression filters, and reverse diffusion separators.

The liquid seasoning to be used in the present invention illustratively includes soy sauce,-squeezed soybean paste dispersion, Worcestershire sauce-type sauce, palatable seasoning, sodium chloride solution, yeast extract solution, sake cake extract solution, fish brewing-sauce, a variety of micro-ground spices in dispersion, for example, pepper powder in dispersion, red pepper powder in dispersion, raw material solution for instant soup of soybean paste, raw material solution for instant clear soup, raw material solution for instant consommé soup, raw material solution for instant potage soup, raw material solution for soup for instant Chinese noodle, and the like.

Among these liquid seasonings illustrated above, soy sauce is a significant and suitable raw material, in particular.

Any soy sauce may be used, with no limitation, as the liquid soy sauce. More specifically, use may be made of for example koikuchi (dark type) soy sauce, usukuchi (pale type) soy sauce, tamari soy sauce, re-brewed soy sauce, shiro (white) soy sauce, and draft soy sauce.

The liquid dispersion medium and the liquid seasoning may be mixed together, with no specific limitation, at any ratio. Because the liquid dispersion medium also has a tasty effect, however, the mixing ratio of the liquid dispersion medium and the liquid seasoning should be determined, so that the essential tasty effect of the liquid seasoning might not be severely deteriorated or might not be damaged. Otherwise, taking account of the taste of the product powdery seasoning and estimating the strength thereof, the mixing ratio of the liquid dispersion medium to the liquid seasoning should be determined.

When general brewed soy sauce is applied as the raw material of a liquid seasoning, for example, the liquid dispersion medium is preferably mixed into soy sauce at a weight ratio of about 0.25 to 3.0 to the weight of the soy sauce or at a total nitrogen ratio of about 0.4 to 6.0 to the total nitrogen of the soy sauce.

Any method and apparatus may be used, with no limitation, for spray drying the mixture of the liquid dispersion medium and the liquid seasoning.

For example, use may be made of compression nozzle type spray dryers, double nozzle type spray dryers, disk-type spray dryers, dryers both for spray drying and granulation.

At the process of spray drying, the elimination of aroma (flavor) should be avoided, but other conditions for the procedures are without any specific limitation. For example, general spray drying conditions may be applicable, for example presetting the air discharging temperature to 80 to 100° C.

It should be noted that incidental partial overheating of the liquid dispersion medium and liquid seasoning as the raw materials should be avoided.

The partial overheating of the raw materials induces "scorching" in the apparatus, involving the decrease of the product yield, and also induces the decrease of the operation efficiency of the apparatus, accompanied by the difficulty in cleaning the apparatus after its operation. Furthermore, "browned materials" generated from such "scorching" markedly deteriorate the taste and flavor of the product powdery seasoning. Additionally, such materials may promote the deterioration of the color of the product under storage.

The powdery seasoning produced by the production process of the present invention contains higher levels of tasty amino acids and low-molecular peptides. Even under severe storage conditions, the present powdery seasoning can retain preferable taste and flavor immediately after the production with no occurrence of coagulation or denaturation for a long term. Thus, the powdery seasoning is applicable as seasoning for instant foods which should keep long-term shelf life. The seasoning is therefore applicable to a wide variety of fields.

The present invention will now be described in detail in examples. It should be noted that the present invention is never limited to these examples.

DESCRIPTION OF THE PREFERRED EMBODIMENTS

EXAMPLE 1

1A) Heating and Expansion of Defatted Soybean:

Defatted soybean (100 kg; NSI=60, "KOJIMAME" as the product name, manufactured by TOYO OIL MILL KABUSHIKI KAISHA, Japan) was crushed and placed in a vessel, followed by addition of tap water (40 L). Immediately after the addition of water, the soybean was fed into a mono-axial extruder, "X-150/55" as product name (manufactured by WENGER CO.), mounting a die with a spouting exit hole of 6 mm in diameter. The extruder was adjusted to 150° C. for inner temperature of the barrel, 45 to 55 seconds for required time to pass through the barrel, and 8 to 15 kg/cm$^2$ for inner pressure of the barrel during the operation. The defatted soybean was continuously heated and pressurized while passing through the barrel, and puffed out to form expanded soybean upon exit from the barrel by the rapid decompression at the exit hole.

1B) Culturing Koji Mold in the expanded soybean obtained by Process 1A:

A total amount of 138 kg of the expanded soybean was obtained from the process 1A. The moisture content of the expanded soybean was 28%. Five masses of the expanded soybean, each having an amount of 1.22 kg, were prepared and cooled to 30° C. Then, each mass was used to culture the koji mold as following manner.

Firstly, the moisture content of the each mass of the expanded soybean was adjusted to 35% by spraying 318 mL of hot water (40° C.) from a spray nozzle. Then, 1 g of soy sause brewing koji seed culture, "Usumurasaki" (product name, commercially available from KABUSHIKI KAISHA HIGUCHI MATSUNOSUKE SHOTEN, Japan), and 1 g of wheat flour were mixed and sowed evenly over the surface of the each mass which was laid in an individual koji culturing box. The fermentation was carried out in each of the five boxes at 35° C. for 45 hours, the culture was stirred over by manual handling at every 8 hours intervals, and the koji culturing was finalized on 45 hours.

1C) Maintaining Dispersion of Culture from Process 1B within Sodium Chloride Solution under Enzymatically Active Condition:

The five masses of the koji culture, each having an amount of 1.41 kg, were obtained from the respective culturing boxes. Each of the masses was soaked in and mixed with a sodium chloride solution (2.4 L) of different concentrations to form an aqueous dispersion of the culture, and the dispersion was maintained in the solution at 30° C. for a predeterimined period as shown in table A.

TABLE A

|  | Concentration (wt %) | Maintained Period (hr) |
|---|---|---|
| Case-1 | 15 | 300 |
| Case-2 | 15 | 300 |
| Case-3 | 10 | 300 |
| Case-4 | 12 | 170 |
| Case-5 | 15 | 170 |

Upon completion of the maintaining period, five samples of the reaction product, i.e., "Moromi" or brewed mash, were obtained in an amount of 3.94 kg in each of the cases 1 to 5, respectively, by hydrolysis reaction of soybean proteins, and the sodium chloride content of these samples was in a range between 7.0 to 9.5%.

1D) Collecting Liquid Dispertion Medium from the Reaction Product generated in Process 1C:

The five samples obtained by the process 1C were pressed respectively by means of a filter press for solid-liquid separation, thereby obtaining a liquid dispersion medium as the filtrate substantially free of solids in an amount of 2,500 mL respectively.

1E) Mixing Liquid Seasoning and the Filtrate or Hydrolysate Solution obtaind by Process 1D to form a Mixture:

The resulting filtrate of the sample reacted in the case-1 of the process 1D, a hydrolysate solution of 2.5 g/dL of the total nitrogen concentration, was mixed with a commercially available Usukuchi soy sauce of 1.2 g/dL of the total nitrogen concentration (manufactured by HIGASHIMARU SOY SAUCE KABUSHIKI KAISHA, Japan) at the ratio of; 3:1 (case A1); 1:1 (case B1) or 1:3 (case C1). The total nitrogen ratios of the mixtures were 1:0.7 (A1), 1:2.1 (B1) and 1:6.2 (C1).

1F) Spray Drying the Mixture obtained by Process 1E:

These mixture solutions, each amount of 1 L, were conducted to spray drying using a nozzle-type spray dryer, Type ON-20 (manufactured by KABUSHIKI KAISHA OKAWARA SEISAKUSHO, Japan). The air discharging temperature at an exhaust pipe of the dryer was adjusted to 95° C. during the operation, and three types of powdery soy sauce test samples, A1, B1 and C1 (Test Samples A1, B1 and C1), were prepared in the amount of 72 g (A1), 70 g (B1) and 75 g (C1), respectively. The moisture content of the samples were 8.2% (A1), 7.7% (B1) and 6.0% (C1).

Also, Powdery soy sauce control sample Ac1 (Control Ac1) was prepared by spray drying only the usukuchi soy sauce under the same conditions; powdery soy sauce control sample Bc1 (Control Bc1) was prepared, by adding dextrin (manufactured by SANWA DENPUN KABUSHIKI KAISHA, Japan), instead of the hydrolysate solution, at 30% by weight of the dry matters of the awakuchi soy sauce to prepare a dispersion and spray drying the dispersion under the same conditions. Herein, the dextrose equivalent (D.E.) of the dextrin in Control Bc1 was 6 to 8.

1G) Evaluation of Adhesion during Production of Powdery Soy Sauce:

Spray drying the raw material solutions of Test Samples A1, B1 and C1 and Controls Ac1 and Bc1 independently for one hour or a period as long as operation possible, evaluation was made of the adhesion of these samples to the inner wall of the drying tower and the inside of the pipe works in the spray drying apparatus under macroscopic observation. The standard of evaluation was divided into four stages of "Absolutely no adhesion" (◉), "Slight adhesion" (○), "Heavy adhesion" (Δ) and "No operation due to adhesion" (×). Table 1 shows the results of evaluation.

TABLE 1

Adhesion during powdery soy sauce production

| Samples (Raw Material Solutions) | Adhesion |
|---|---|
| Control Ac1 (Usukuchi SS) | Δ |
| Control Bc1 (SS + Dextrin) | ○ |
| Test Sample A1 (3:1) | Δ |
| Test Sample B1 (1:1) | ○ |
| Test Sample C1 (1:3) | ⊚ |

Numerical figures in parentheses are weight ratios of Soy Sauce:Hydrolysate. "SS" means Soy Sauce.

As shown in Table 1, the same degree of adhesion as the adhesion in Control Bc1 with addition of dextrin or a lower degree of adhesion was observed in Test Samples B1 and C1, namely the samples with addition of the hydrolysate solution at 50% or more. On the contrary, marked adhesion was observed in Control Ac1 in about 30 minutes, and therefore, the operation could not be continued any more.

1H) Determination of Water Retention of Powdery Soy Sauce:

Immediately after spray drying from the Process 1F, five samples in total, namely Test Samples A1, B1 and C1 and Controls Ac1 and Bc1, were determined of their water retention by means of a constant temperature dryer with a wire heater at a heating portion, i.e., "Circulation Oven" (manufactured by MITAMURA RIKEN KABUSHIKI KAISHA, Japan). Keeping these samples at a sample temperature of 105° C. and ambient pressure in the dryer for 4 hours, these samples were then left to stand for cooling to room temperature in a sealed vessel. Table 2 shows the weight loss as the percentage of the weight after drying to the initial weight.

TABLE 2

Water retention of powdery soy sauce samples immediately after spray drying

| Samples | Water Retention (%) |
|---|---|
| Control Ac1 (Usukuchi SS) | 10.0 |
| Control Bc1 (SS + Dextrin) | 7.8 |
| Test Sample A1 (3:1) | 8.2 |
| Test Sample B1 (1:1) | 7.7 |
| Test Sample C1 (1:3) | 6.0 |

Numerical figures in parentheses are weight ratios of Soy Sauce:Hydrolysate. "SS" means Soy Sauce.

As shown in Table 2, it is observed that the Test Samples A1, B1, and C1 with addition of the hydrolysate were apparently dried at higher degrees, compared with Control Ac1 composed of usukuchi soy sauce alone; and it is also observed that these Samples were dried at the same degree as or at a higher degree than Control Bc1 with addition of dextrin. Furthermore, it is indicated that the degree of drying was elevated approximately in proportion to the ratio of the hydrolysate added.

1I) Change of Water Retention of Powdery Soy Sauce over Time:

Five samples in total, i.e., Test Samples A1, B1 and C1 and Controls Ac1 and Bc1, were stored in environment at a relative humidity of 33±2% for 0 (immediately after spray drying), 3, 7 or 17 days. Their water retention was determined. The same method and apparatus as in the Process 1G were used. The change of water retention for individual storage periods is shown in Table 3.

TABLE 3

Change of water retention of powdery soy sauce samples over time (%)

| | Storage period (days) | | | |
|---|---|---|---|---|
| Samples | 0 | 3 | 7 | 17 |
| Control Ac1 (Usukuchi SS) | 10.0 | 11.8 | 11.9 | 12.0 |
| Control Bc1 (SS + Dextrin) | 7.8 | 9.5 | 10.3 | 10.2 |
| Test Sample A1 (3:1) | 8.2 | 10.7 | 11.0 | 11.0 |
| Test Sample B1 (1:1) | 7.7 | 9.3 | 9.7 | 9.7 |
| Test Sample C1 (1:3) | 6.0 | 9.2 | 9.5 | 9.5 |

Numerical figures in parentheses are weight ratios of Soy Sauce:Hydrolysate. "SS" means Soy Sauce.

As shown in Table 3, it is observed that the Test Samples A1, B1 and C1 with addition of the hydrolysate were kept at highly dry states starting the day immediately after drying to day 17, compared with Control Ac1 composed of usukuchi soy sauce alone and that the Test Samples A1, B1 and C1 were kept dry at the same degree as or at a higher degree than Control Bc1 with addition of dextrin. Furthermore, it is observed that the order of water retention determined immediately after spray drying did not change for the entire storage period and that the water retention on day 3 and thereafter did not markedly change in any sample, which indicates that a lower level of water retention immediately after spray drying, if possibly preset, can be maintained continuously thereafter.

1J) Change of Equilibrium Moisture of Powdery Soy Sauce in Environment at a Different Humidity:

Five samples in total, i.e., Test Samples A1, B1 and C1 and Controls Ac1 and Bc1, were stored in a humid-thermostat at a relative humidity of 10% or less, 22%, 32%, 42% or 52% and the same temperature of 20° C. for 7 days. Then, their water retention was determined. The same method and apparatus as in the Process 1H were used. The equilibrium moisture of each sample at each relative humidity is shown in Table 4.

TABLE 4

Change of equilibrium moisture of powdery soy sauce samples in environment at a different humidity (%)

| | Relative Humidity (RH %) | | | | |
|---|---|---|---|---|---|
| Samples | <10 | 22 | 32 | 42 | 52 |
| Control Ac1 (Usukuchi SS) | 10.2 | 10.4 | 11.4 | 12.2 | 16.2 |
| Control Bc1 (SS + Dextrin) | 8.0 | 9.5 | 9.8 | 11.5 | 15.5 |
| Test Sample A1 (3:1) | 8.2 | 9.6 | 10.4 | 11.5 | 15.5 |
| Test Sample B1 (1:1) | 7.6 | 9.5 | 9.6 | 11.5 | 15.5 |
| Test Sample C1 (1:3) | 6.5 | 7.8 | 8.3 | 10.0 | 13.8 |

Numerical figures in parentheses are weight ratios of Soy Sauce:Hydrolysate. "SS" means Soy Sauce.

As shown in Table 4, it is observed that the Test Samples A1, B1 and C1 with addition of the hydrolysate were kept at highly dry states at individual relative humidities, compared with Control Ac1 composed of usukuchi soy sauce alone. It is also observed that the Test Samples A1, B1 and C1 were kept dry at the same degree as or at a higher degree than Control Bc1 with addition of dextrin. Furthermore, it is observed that the order of water retention at individual relative humidities was determined immediately after spray drying and did not substantially change thereafter. Thus, it is indicated that a lower level of water retention can be maintained at individual relative humidities, depending on the water retention level immediately after spray drying provided that the level is within a lower range.

1K) Change of Fluidity of Powdery Soy Sauce over Time:

Five samples in total, i.e., Test Samples A1, B1 and C1 and Controls Ac1 and Bc1, were stored in open polypropylene bags at a relative humidity of 33±2% for 0 (immediately after spray drying), 3, 7, 17 and 90 days. Then, the change of the fluidity of these powders and the occurrence of coagulation therein were examined visually or under the load of impact with finger tips. The fluidity of the powdery seasonings for individual storage periods was observed. The results are shown in Table 5. In the Table, a symbol ○ represents "good fluidity", Δ "fluid on mild impact", * "fluid on heavy impact",  "strong coagulation not readily degradable", and * "intensely coagulates once and turns hygroscopic to begin deliquescence".

TABLE 5

Change of fluidity of powders of powdery soy sauce samples over time

| Samples | State for individual storage periods (days) | | | | |
|---|---|---|---|---|---|
| | 0 | 3 | 7 | 17 | 90 |
| Control Ac1 (Usukuchi SS) | ○ | Δ | * | ** | *** |
| Control Bc1 (SS + Dextrin) | ○ | ○ | Δ | ** | ** |
| Test Sample A1 (3:1) | ○ | ○ | ○ | Δ | Δ |
| Test Sample B1 (1:1) | ○ | ○ | ○ | ○ | Δ |
| Test Sample C1 (1:3) | ○ | ○ | ○ | ○ | ○ |

Numerical figures in parentheses are weight ratios of Soy Sauce:Hydrolysate. "SS" means Soy Sauce.

As shown in Table 5, the Test Samples A1, B1 and C1 with addition of the hydrolysate were kept at good fluidity for a long period of time; and no substantial coagulation was observed in any of these samples for a period more than 90 days. In contrast, Control Ac1 composed of usukuchi soy sauce alone coagulated on day 7; the Control Ac1 turned hygroscopic into a deliquescent state, 90 days later. Control Bc1 with addition of dextrin coagulated on day 7 and thereafter, which turned into a strong coagulation state on day 17 and thereafter.

1L) Change of Taste and Aroma (Flavor) of Powdery Soy Sauce after Storage:

Five samples in total, i.e., Test Samples A1, B1 and C1 and Controls Ac1 and Bc1, were stored in open polypropylene bags at a relative humidity of 33±2% for 0 (immediately after spray drying), or 17 days. Then, these samples were tested for sensual evaluation. The samples each were dissolved in ion exchange resin-treated water to a final concentration of 1.0 wt/vol % and then kept at 25° C. For sensual evaluation, the resulting sample solutions were examined in a free talking fashion (or in a round-table system) by a testing paneler of seven members from the viewpoint of taste (degrees of palatable taste and saline taste), flavor (presence or absence of scorching odor, extent of soy sauce flavor), and color toning (dark or pale). The overall outcome on the basis of the individual results of evaluation was divided in to the three stages of "very preferable" (mark ⊚), "preferable" (mark ○) and "some drawbacks observed" (mark Δ). The results concerning the individual evaluation items are shown in Table 6.

TABLE 6

Change of taste and flavor of powdery soy sauce samples after storage

| | Evaluation at organoleptic Test | | | | | |
|---|---|---|---|---|---|---|
| | Taste | | Flavour | | | Gen. |
| Samples | Palatable taste | Saline taste | Scorch odor | SS flavor | Color Tone | Evaluation |
| Strage Period: Immediately after spray drying | | | | | | |
| Control Ac1 (Usukuchi SS) | strong | strong | strong | strong | dark | Δ |
| Control Bc1 (SS + Dextrin) | weak | weak | detect | weak | pale | Δ |
| Test Sample A1 (3:1) | strong | good | weak | good | dark | ⊚ |
| Test Sample B1 (1:1) | strong | good | weak | good | dark | ⊚ |
| Test Sample C1 (1:3) | strong | good | weak | weak | dark | ⊚ |
| Strage Period: On day 17 under storage | | | | | | |
| Control Ac1 (Usukuchi SS) | strong | strong | strong | detect | dark | Δ |
| Control Bc1 (SS + Dextrin) | weak | weak | detect | weak | pale | Δ |
| Test Sample A1 (3:1) | strong | good | none | good | dark | ⊚ |
| Test Sample B1 (1:1) | strong | good | none | good | dark | ⊚ |
| Test Sample C1 (1:3) | strong | good | weak | weak | dark | Δ |

Numerical figures in parentheses show the weight ratio of Soy Sauce:Hydrolysate. "SS" means Soy Sauce.

As shown in Table 6, no substantial deterioration of taste, flavor or color toning was observed in any of the Test Samples A1, B1 and C1 with addition of the hydrolysate under storage for 17 days. In contrast, substantial deterioration of taste, flavor and color toning was observed in Control Ac1 composed of usukuchi soy sauce alone and Control Bc1 with addition of dextrin under storage for 17 days. Control Ac1 was severely deteriorated, in particular. Control Bc1 was less tasty with less flavor than the remaining samples, immediately after spray drying and thereafter; the color toning thereof was apparently powdery.

EXAMPLE 2

2A) Production of Powdery Yeast Extract:

Yeast extract in paste, i.e., "Yeast Peptone Paste" (100 g; manufactured by Bio-Springer Co. Ltd.) was solubilized in ion exchange resin-treated water (600 g) to prepare a dispersion. Subsequently, the solid matters in dispersion were filtered off. Into the yeast extract solution was mixed the same hydrolysate solution as in the Process 1E of Example 1 at a ratio of 3:1 (case A2), 1:1 (case B2) or 1:3 (case C2). These mixture solutions were spray dried under the same conditions as in the Process 1F of Example 1, to prepare three types of powdery yeast extract test samples A2, B2 and C2. Herein, the nitrogen ratios of the mixture solutions were 1:0.7 (case A2), 1:2.1 (case B2) and 1:6.3 (case C2), in this order.

Powdery yeast extract control sample Ac2 (Control Ac2) was prepared by spray drying only the same yeast extract solution under the same conditions.

2B) Evaluation of Adhesion during Production of Powdery Yeast Extract:

Spray drying the raw material solutions (mixture solutions) of Test Samples A2, B2 and C2 and Control Ac2 independently for one hour or a period as long as operation possible, evaluation was made of the adhesion of these samples to the inner wall of the drying tower and the inside of the pipe works in the spray drying apparatus under macroscopic observation. The standard of evaluation was divided into four stages of "absolutely no adhesion" (mark ⊚), "slight adhesion" (mark o), "severe adhesion" (mark Δ), and "no operation due to adhesion" (mark ×) as in the Process 1G of Example 1. Table 7 shows the results of the evaluation.

TABLE 7

Adhesion during powdery yeast extract production

| Samples (Raw material solutions) | Adhesion |
|---|---|
| Control Ac2 (yeast extract solution) | Δ |
| Sample A2 (3:1) | Δ |
| Sample B2 (1:1) | ⊚ |
| Sample C2 (1:3) | ⊚ |

Numerical figures in parentheses are weight ratios of Yeast Extract Solution:Hydrolysate.

As shown in Table 7, no substantial adhesion was observed in the Test Samples B2 and C2, namely the test samples with addition of the hydrolysate at 50% or more. Slight adhesion occurred, but it was completely eliminated (peeled off) from the inner wall of the drying tower by gentle shaking of the outer wall thereof. Alternatively, in about 25 minutes, greater adhesion was observed in Control Ac2 composed of the yeast extract alone, and therefore, the operation could not be continued any more.

2C) Assay of Water Retention of Powdery Yeast Extract:

Immediately after spray drying in the aforementioned Process 2A, four samples in total, namely Test Samples A2, B2 and C2 and Control Ac2, were measured of their water retention by means of the same dryer as in the Process 1H of Example 1 under the same conditions. The water retention was measured as shown in Table 8.

TABLE 8

Water retention of powdery yeast extract samples immediately after spray drying

| Samples | Water retention (%) |
|---|---|
| Control Ac2 (yeast extract solution) | 10.5 |
| Test Sample A2 (3:1) | 9.2 |
| Test Sample B2 (1:1) | 8.0 |
| Test Sample C2 (1:3) | 6.5 |

Numerical figures in parentheses are weight ratios of Yeast Extract Solution:Hydrolysate.

As shown in Table 8, the Test Samples A2, B2 and C2 with addition of the hydrolysate were apparently dried at higher degrees, compared with Control Ac2 composed of the yeast extract alone. Furthermore, it is observed that the degree of drying was elevated approximately in proportion to the ratio of the hydrolysate added.

EXAMPLE 3

3A) Production of Powdery Sake Cake Extract:

Sake cake in plate (manufactured by Mercian, Co. Ltd.) was dispersed and suspended into ion exchange resin-treated water of a weight 4-fold that of the wet weight of the sake cake, prior to sufficient swelling. Subsequently, protease and cellulase (both manufactured by Amano Pharmaceuticals, Co. Ltd.) were added to the resulting suspension. After keeping the mixture to 40° C. for 30 hours, the solid matters in suspension were filtered off. The same hydrolysate as in the Process 1E of Example 1 was added to the sake cake extract solution to a final weight ratio of 5:1 (case A3), 4:1 (case B3), 3:1 (case C3), 2:1 (case D3) or 1:1 (case E3). Spray drying these mixtures under the same conditions as in the Process 1F of Example 1, five types of powdery sake cake extract test samples A3, B3, C3, D3 and E3 were recovered. Herein, the nitrogen ratios of the mixture solutions were 1:0.45 (case A3), 1:0.57 (case B3), 1:0.76 (case C3), 1:1.1 (case D3) and 1:2.3 (case E3), in this order.

Spray drying further the same sake cake extract solution alone under the same conditions, sake cake extract control sample Ac3 in paste (Control Ac3) was recovered additionally.

3B) Evaluation of Adhesion during Production of Powdery Sake Cake Extract:

Spray drying the raw material solutions of Test Samples A3, B3, C3, D3 and E3 and Control Ac3 independently for one hour or a period as long as operation possible, evaluation was made of the adhesion of these samples to the inner wall of the drying tower and the inside of the pipe works in the spray drying apparatus under macroscopic observation. As in the Process 1G of Example 1, the standard of evaluation was divided into four stages of "absolutely no adhesion" (mark ⊚), "slight adhesion" (mark o), "severe adhesion" (mark Δ) and "no operation due to adhesion" (mark ×). Table 9 shows the results of evaluation.

TABLE 9

Adhesion during powdery sake cake extract production

| Samples (Raw material solutions) | Adhesion |
|---|---|
| Control Ac3 (sake cake extract solution) | × |
| Test Sample A3 (5:1) | Δ |
| Test Sample B3 (4:1) | o |
| Test Sample C3 (3:1) | o |
| Test Sample D3 (2:1) | ⊚ |
| Test Sample E3 (1:1) | ⊚ |

Numerical figures in parentheses are weight ratios of Sake Cake Extract Solution:Hydrolysate.

As shown in Table 9, no adhesion was observed in the Test Samples C3, D3 and E3, namely the test samples with addition of the hydrolysate solution at 25% or more; otherwise, only extremely slight adhesion was observed. Only immediately after the initiation of the operation, alternatively, adhesion occurred in Control Ac3 composed of the sake cake extract solution alone. Subsequently, the adhesion rapidly grew until the operation could not be continued any more. Consequently, no powdery product could be generated, to recover only a product in paste.

3C) Determination of Water Retention of Powdery Sake Cake Extract:

Six samples in total, namely the Test Samples A3, B3, C3, D3 and E3, which were recovered immediately after spray drying in the Process 3A, and Control A3 which turned viscous after the spray drying process, were determined of their water retention by means of the same dryer as in the Process 1H of Example 1 under the same conditions. The water retention was measured. The results are shown in Table 10.

TABLE 10

Water retention of powdery sake cake extract immediately after spray drying

| Samples | Water retention (%) |
|---|---|
| Control Ac3 (sake cake extract)*[1] | — |
| Test Sample A3 (5:1) | 9.5 |
| Test Sample B3 (4:1) | 8.4 |
| Test Sample C3 (3:1) | 7.5 |
| Test Sample D3 (2:1) | 5.0 |
| Test Sample E3 (1:1) | 4.5 |

Numerical figures in parentheses are weight ratios of Sake Cake Extract Solution:Hydrolysate.
*[1]Viscous matter in paste (powder recovery impossible)

As shown in Table 10, the Test Samples A3, B3, C3, D3 and E3 with addition of the hydrolysate, were apparently dried at higher degrees, compared with Control Ac3 composed of sake cake extract alone with no additives. Furthermore, it is observed that the degree of drying was elevated approximately in proportion to the ratio of the hydrolysate added. Still further, it was observed that distinctive "scorching odor" and "browning" phenomena developed in Control Ac3.

As has been described above, the method of the present invention has advantages such that a spray dryer can be operated in a smooth manner to produce a high-quality powdery seasoning at less cost under conditions suitable for mass production. Also, the powdery seasoning produced by the method of the present invention can maintain its good powdery state with no occurrence of coagulation or with no deterioration even under severe storage conditions. Thus, the seasoning, thus obtained, can retain attractive taste and flavor immediately after spray drying for a long period of time.

The present application is based on Japan 07-052024 filed Feb. 17, 1995, and this priority document is incorporated by reference into the present U. S. application.

What is claimed is:

1. A method for producing powdery seasoning, comprising the following steps:
   a) heating and expanding defatted soybean, having a water-soluble nitrogen index of 30% or more, with a rapid decompression treatment by means of an extruder so as to provide a final antigen titer of 3 or less for the defatted soybean and to form an expanded soybean;
   b) adding water to the expanded soybean obtained in step a) to provide a final water content in the range of 30 wt % to 40 wt % based on total weight, and then culturing soy sauce brewing koji mold in the expanded soybean;
   c) preparing and maintaining a dispersion of the culture from step b), in the form of an aqueous dispersion within a sodium chloride solution having a concentration in the range of 3 wt % to 5 wt %, under enzymatically active conditions within a pH range of 1.5 to 6.5 and at a temperature within the range of 25° C. to 40° C. for up to 300 hours until formol-type nitrogen reaches 50% or more of the total nitrogen contained in said dispersion, to obtain a reaction product;
   d) separately collecting a liquid dispersion medium from the reaction product generated in step c);
   e) mixing said liquid dispersion medium collected in step d) with soy sauce at a weight ratio of 0.25 to 3.0 to the weight of the soy sauce or at a ratio of 0.4 to 6.0 to the total nitrogen content of the soy sauce, to provide a mixture; and
   f) spray drying said mixture obtained in step e) by means of a nozzle-type spray dryer at an air discharge temperature in the range of 80° C. to 100° C.

2. A method for producing powdery seasoning, comprising the following steps:
   a) heating and expanding defatted soybean, having a water-soluble nitrogen index of 30% or more, with a rapid decompression treatment by means of an extruder so as to provide a final antigen titer of 3 or less for the defatted soybean and to form an expanded soybean;
   b) adding water to the expanded soybean obtained in step a) to provide a final water content in the range of 30 wt % to 40 wt % based on total weight, and then culturing soy sauce brewing koji mold in the expanded soybean;
   c) preparing and maintaining, a dispersion of the culture from step b), in the form of an aqueous dispersion within a sodium chloride solution having a concentration in the range of 5 wt % and 10 wt % under enzymatically active conditions within a pH range of 1.5 to 6.5 and at a temperature within the range of 25° C. to 40° C. for up to 300 hours until formol-type nitrogen reaches 50% or more of the total nitrogen contained in said dispersion, to obtain a reaction product;
   d) separately collecting a liquid dispersion medium from the reaction product generated in step c);
   e) mixing said liquid dispersion medium collected in step d) with a liquid seasoning, selected from the group consisting of soy sauce, yeast extract and sake cake extract, at a weight ratio of 0.25 to 3.0 to the weight of the liquid seasoning or at a ratio of 0.4 to 6.0 to the total nitrogen content of the liquid seasoning, to provide a mixture; and
   f) spray drying said mixture obtained in step e) by means of a nozzle-type spray dryer at an air discharge temperature in the range of 80° C. to 100° C.

3. The method according to claim 2, wherein said liquid seasoning is soy sauce.

4. The method according to claim 2, wherein said liquid seasoning is yeast extract.

5. The method according to claim 2, wherein said liquid seasoning is sake cake extract.

* * * * *